United States Patent [19]
Mottier

[11] 4,440,839
[45] Apr. 3, 1984

[54] METHOD OF FORMING LASER DIFFRACTION GRATING FOR BEAM SAMPLING DEVICE

[75] Inventor: Francois M. Mottier, West Hartford, Conn.

[73] Assignee: United Technologies Corporation, Hartford, Conn.

[21] Appl. No.: 468,614

[22] Filed: Feb. 22, 1983

Related U.S. Application Data

[63] Continuation of Ser. No. 244,943, Mar. 18, 1981, abandoned.

[51] Int. Cl.³ .................. G03H 1/04; G03H 1/22; G03H 1/26
[52] U.S. Cl. .................................. 430/2; 430/1; 430/5; 430/321; 430/323; 350/3.69; 350/3.7; 350/3.72; 350/3.73; 350/162.16; 350/162.17; 350/162.2; 350/162.23
[58] Field of Search ............... 430/1, 2, 321, 5, 323; 350/3.69, 3.7, 3.72, 3.73, 169, 162.16, 162.17, 162.2, 162.23

[56] References Cited

U.S. PATENT DOCUMENTS

| | | | |
|---|---|---|---|
| 3,630,593 | 12/1971 | Bartelt | 430/1 |
| 3,752,555 | 8/1973 | Klotz | 350/3.73 |
| 3,806,221 | 4/1974 | Kiemle | 430/1 |
| 3,941,450 | 3/1976 | Spitz et al. | 350/3.73 |
| 3,944,420 | 3/1976 | Gale et al. | 430/1 |
| 3,945,825 | 3/1976 | Gale et al. | 430/1 |
| 3,947,085 | 3/1976 | Mottier | 350/3.69 |
| 3,957,353 | 5/1976 | Fienup et al. | 430/1 |
| 3,985,439 | 10/1976 | Kiemle | 430/1 |
| 4,402,571 | 9/1983 | Cowan et al. | 350/162.17 |

FOREIGN PATENT DOCUMENTS 1189928   9/1967   United Kingdom ............ 430/1

OTHER PUBLICATIONS

Nakajima, J., et al., "Copied Phase Hologram of Photoresit", Fujitsu Sci. Tech. J. C. (Japan), vol. 6, No. 3, 9/70, p. 69–71.

Caulfield, H. J., et al., *The Application of Holography*, J. Wiley & Sons, 1970, p. 23–25, 86–90, 92, 110–112, & 124–125.

Gladden, J., *Review of Photosensitive Materials for Holographic Recordings*, ETL-0128, AD-A055013, 4/78, p. 4–6.

Garvey, J. O., et al., "Holographic Grading Study Report", vol. I, Report No. p. 78-1372, Hughes Air Craft, 8/78, p. 116.

Goodman, J. W., *Introduction To Fourier Optics*, McGraw—Hill, 1968, p. 142–144.

*Primary Examiner*—Charles L. Bowers, Jr.
*Attorney, Agent, or Firm*—Eric W. Petraske

[57] ABSTRACT

A combined holographic grating that samples a high energy laser beam and focuses the sample into a spot is formed by the cross-modulation term of a linear holographic grating and a holographic zone plate.

8 Claims, 5 Drawing Figures

METHOD OF FORMING LASER DIFFRACTION GRATING FOR BEAM SAMPLING DEVICE

This is a continuation of application Ser. No. 244,943 filed on Mar. 18, 1981, now abandoned.

DESCRIPTION

1. Technical Field

The invention relates to a device for sampling a high power laser beam and for focusing the sampled beam into a spot. The sampling is effected by a holographic grating deposited on a mirror surface, which grating is formed by the cross-modulation term of a holographic diffraction grating and a holographic zone grating.

2. Background Art

It is known in the art to deflect and focus a beam by means of an off-axis focusing grating that consists of a set of continuous curved lines that are spaced so as to diffract a sample of a beam to one side, and also to focus the diffracted sampled beam. One such grating is illustrated in an article entitled "Compensating Optical Systems" by Robert H. Katyl, which appeared in Applied Optics, Vol. 11, No. 5, page 1241, 1972. This article discloses the use of an off-axis focusing grating together with a separate lens for the purpose of correcting chromatic aberrations introduced by the grating.

The straightforward approach to fabricating a grating having the required performance is to record a suitable first hologram called a "mother hologram" in visible light at a wavelength scaled geometry smaller than the final master hologram and subsequently to enlarge the mother hologram by the ratio of high energy laser wavelength to original recording laser wavelength to form a final master hologram used as a grating pattern. Unfortunately, with this approach, error limits in the final master hologram of a certain dimension require that the errors in the mother hologram be scaled down by the magnifying factor. This approach also requires very stringent tolerances on the enlarging lens. For many applications, the optical tolerances required by this approach are beyond the capabilities of existing optical systems.

In the particular case of monitoring the optical quality of a laser beam, the tolerances required of the optical system and the hologram are much greater than many other applications. For example, it is frequently desired to monitor the accuracy of the phase front of a high power laser beam to within a small fraction of a wavelength. The monitoring system, of course, must introduce errors in the sampled beam that are small compared with errors that it is desired to monitor. For example, if a $CO_2$ laser beam at 10.6 micrometers having a diameter of 25 centimeters is the high power beam and it is desired to sample that beam and to focus the sampled beam to a spot 1 meter from a mirror and displaced by 25 centimeters from the reflected high power beam and if it is desired to conserve the phase of the illuminating wave in a sampled beam to better than one-twentieth of a wavelength, a straightforward calculation shows that the off-axis focusing grating will require groove densities of up to 34 line pairs per millimeter, corresponding to a groove pitch of 29 micrometers. The phase preservation requirement results in a requirement that the spacing of the grating grooves be within 1.5 micrometers of their nominal position. Since the mother hologram is smaller than the final master hologram, the corresponding tolerance on the mother hologram is 0.09 micrometers for a recording wavelength of 633 nanometers. Unfortunately, the emulsion wandering in typical photographic media is comparable in size to the spacing requirement and thus there will be random errors introduced into the line spacing that will be comparable to the limits on line spacing error. The enlarging lens system will need a speed of F/3.5 or faster in order to transfer the dense fringes with 50% contrast while at the same time the distortion introduced by the enlarging lens system must be less than 0.0012% in a 25 centimeter diameter field. It is believed that these and similar requirements for the accuracy of recording the mother hologram and the enlargement of the mother hologram to form the master hologram are beyond the capabilities of present optical systems.

DISCLOSURE OF INVENTION

A new form of beam sampling device is formed by combining the modulation function of a linear holographic diffraction grating with the modulation function of a holographic zone plate to form a cross product grating, thus reducing the required spatial frequency of the final device.

BEST MODE FOR CARRYING OUT THE INVENTION

Figure 1:
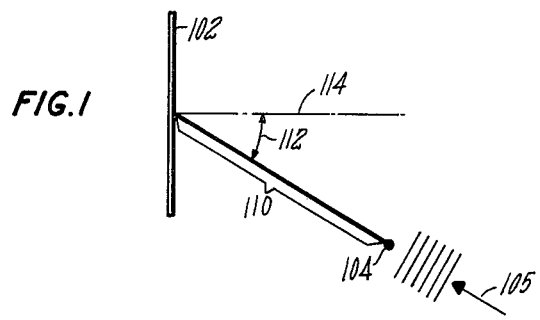
FIG. 1 illustrates one step in manufacturing a grating according to the invention.
Figure 2:
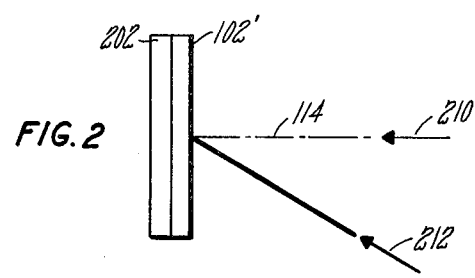
FIG. 2 illustrates a second step in manufacturing a grating according to the invention.

The zone plate portion of the final hologram is formed by first recording the in line (Gabor-type) hologram of a point source. In FIG. 1 an interference pattern is formed on emulsion plate 102 by the interference of two beams of coherent radiation from point source 104 and plane wave 105. These two beams may be generated from the same laser source and combined using conventional techniques well known to those skilled in the art. The particular combination of optical elements used is not part of the invention and is omitted from the drawing for simplicity. Point source 104 and plane wave 105 both are aligned along a direction 112 from the central normal 114 of emulsion plate 102, with source 104 being spaced a distance 110 from plate 102. Angle 112 is the same angle at which the sampled beam will come off in the final embodiment. Distance 110 is scaled down from the final distance to which the sample beam will be focused by the ratio of final wavelength to exposure wavelength. It is well known to those skilled in the art that the scaling process required for the fabrication of holograms to be used in the infrared preserves angles and changes distances. The pattern formed by interference of the light waves from point sources 104 and plane wave 105 on plate 102 will consist of a number of generally curved lines which form a holographic zone plate having the property of focusing radiation propagating in opposite direction to wave 105 along direction 112 to point 104. Photographic plate 102 is then developed and enlarged to form a new plate 102' which is scaled up in dimension by the same ratio of design wavelength to exposure wavelength. In FIG. 2, scaled plate 102' is placed adjacent unexposed plate 202. Plate 102' will be contact printed onto plate 202 by means of two beams of coherent radiation 210, 212 illustrated schematically in FIG. 2. Beams 210 and 212 are oriented and spaced in order to establish on plate 202 a linear holographic diffraction grating that will deflect a predetermined amount of a high energy laser beam at the design wavelength into the direction given by angle 112 in FIG. 1, the sine of the angle between beams 210 and 212 being the sine of angle 112 divided by the ratio of the design wavelength and the recording wavelength. The exposure of linear holographic gratings is well known to those skilled in the art. The final pattern on plate 202 will comprise a combination of the planar diffraction grating being formed by beams 210 and 212 and the zone plate carried on plate 102'. The linear diffraction grating pattern will only appear on those portions of plate 202 which correspond to undeveloped portions of plate 102'. Those portions of plate 102' that were exposed during the process illustrated in FIG. 1 will be left blank on plate 202. When developed, plate 202 will be the final grating mask carrying the cross product pattern that can be transferred to a mirror surface, e.g. by ion milling a metal mirror through a photoresist replica of plate 202, or by putting the light-sensitive material of plate 202 directly on the mirror surface.

The use of plates 102 and 102' is not necessary for the practice of the invention. It is possible to project the interference pattern used in making the zone plate onto the light sensitive medium of 202, in which case, point source 104 will be displaced so that the fringe spacing of the final pattern on the light sensitive medium is correct for the high power laser beam, according to techniques well known to those skilled in the art. Light-sensitive medium 202 may be exposed to the two interference patterns simultaneously or sequentially.

Figure 3:
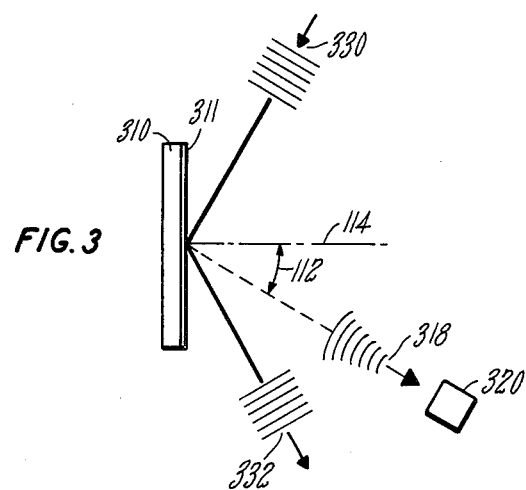
FIG. 3 illustrates the operation of the final grating.

In FIG. 3, the operation of the final grating is illustrated. Mirror 310, a conventional mirror for handling high power radiation, has impressed on it a grating 311 formed by the deposition of the pattern carried by plate 202 onto photoresist on the mirror surface and ion milling through the developed photoresist. High power laser beam 330, illustratively a plane wave, impinges on the surface of mirror 310 and is reflected along direction 332. A sample of beam 330 is deflected along the direction 318 at an angle 112 to the normal of mirror 310. This sample beam is focused into detector 320, located at a corresponding point to point 104 in FIG. 1.

Figure 4:
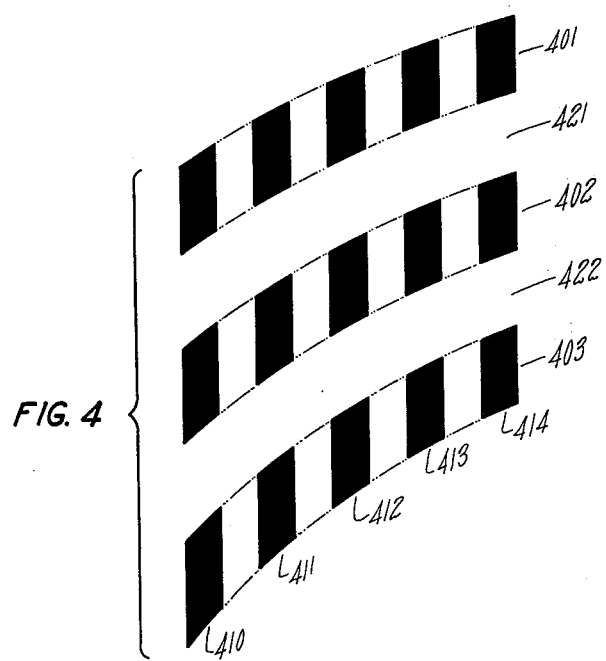
FIG. 4 illustrates schematically the pattern produced by the deposition of a grating formed according to the invention.

In FIG. 4, a portion of the final grating mask 202 is illustrated, in which zones 401, 402 and 403 are those that are substantially transparent in zone plate 102'. Regions 421 and 422, appearing blank in FIG. 4 are those for which plate 102 was exposed. Within zones 401, 402 and 403, there appear dark fringes 410, 411, 412, 413 and 414, which are the dark fringes of the linear diffraction grating formed in the third step of making grating 202. The pattern of light and dark areas of the zone plate and the pattern of light and dark areas of the linear diffraction grating can both be represented by functions of the coordinates of the mirror surface, these functions being well known to those skilled in the art and are referred to here as distribution functions. The pattern appearing in FIG. 4 represents a combination of the two foregoing patterns, which is not a superposition of the two functions, but rather a cross product so the pattern is referred to as a cross product pattern and the grating so produced is referred to as a cross product grating.

Figure 5:
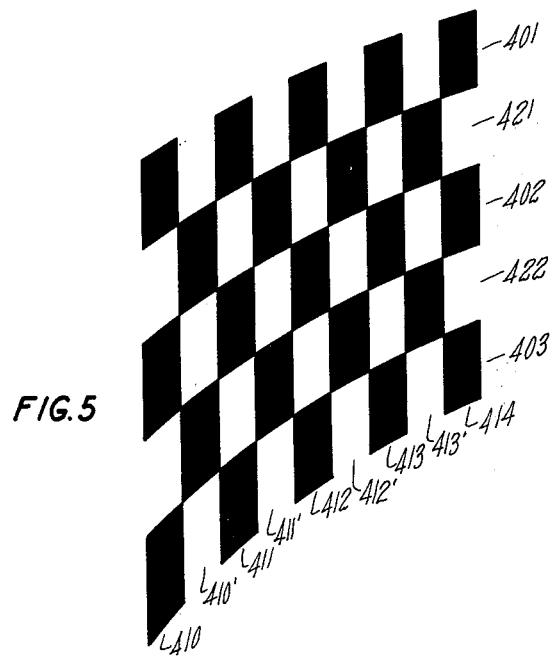
FIG. 5 illustrates an alternative embodiment of the invention.

It is well known in the art that diffraction gratings have more than one order, conventionally the first order only being used. The grating illustrated in FIG. 4 contains all orders of the zone plate and all orders of the plane diffraction grating. Only the first order cross product of the linear diffraction grating in the zone plate is used, the other orders representing loss and/or noise. The number of unwanted diffraction orders can be reduced while at the same time increasing the diffraction efficiency into the first cross product by depositing the plane diffraction grating with inverted phase in those zones that were left blank in the embodiment of FIG. 4, (represented by zones 421 and 422 of FIG. 5). In FIG. 5, there is now a zone plate and two linear diffraction gratings, the grating carried in zones 401, 402 and 403 and a second grating, carried in zones in 421 and 422, which second grating was inverted phase with respect to the first grating. The first and second plane gratings are indicated by the lines 410, 410', 411, 411', etc. in FIG. 5. A grating formed according to FIG. 5 will have the first orders of the zone plate and the linear diffraction grating reduced in intensity and the cross product increased in efficiency. Construction of such a grating is accomplished by forming a negative of zone plate mask 102', in which the light and dark regions are reversed, inserting this negative in place of the original plate 102' and re-exposing plate 202 to place the second diffraction grating in zones 421 and 422. It is an advantageous feature of the invention that the single zone plate 102' carries less information than an off-axis focusing grating, so that the spatial frequency is low and alignment is easier than it would be with a mask having spatial frequencies required by prior art off-axis focusing gratings.

It should be noted that the linear diffraction grating is exposed at the full size of the final grating, and therefore that the limiting factor on accuracy of the final grating is the mother hologram formed by interfering the plane wave with the point source. This zone plate hologram now carries less information than a combined off-axis focusing grating would, and therefore has a lower spatial frequency.

The mother hologram of the zone plate formed in step 1, need not be exposed from a point source of optical radiation. It may also be a computer generated plot of arbitrary scaling, i.e., a computer may be used to generate a plot or a transparency at a larger scale which is then reduced in size to form the plate 102' of FIG. 2. The computer generated plot may include the inverse linear grating as described above, thereby eliminating problems in maintaining registration as the different gratings are exposed. The plot also may be a simplified representation of the cross product functions, in that the opacity or blackness of the pattern need not be continuously variable and also in that it may be configured to better suppress unwanted diffraction orders.

The invention has been described with respect to one embodiment, but those skilled in the art will readily recognize variations of the invention. The wave to be sampled may form an arbitrary angle with respect to the surface normal of the grating; the focused wave sample axis need not be in the plane of incidence of the high power laser beam; and the incident wave can be curved, either converging or diverging. This curvature will have to be scaled and duplicated in the reference wave used to record the mother hologram or to compute a mother hologram pattern, according to procedures well known to those skilled in the art. Finally the mirror surface need not be flat, but may have a parabolic, elliptical or other surface figure.

I claim:

1. A method of forming a cross product diffraction grating on a surface of a laser mirror for deflecting a sampled beam of predetermined wavelength from a beam incident on said mirror surface and focusing said sampled beam, comprising the steps of:

generating a zone plate interference pattern for a Gabor-type holographic zone plate, said zone plate pattern having predetermined parameters for focusing deflected radiation at a predetermined position;

generating a linear interference pattern for a first holographic diffraction grating for deflecting a sample beam of optical radiation towards said predetermined position;

forming a cross product interference holographic pattern in a light-sensitive medium by exposing said light-sensitive medium to said interference patterns; and transferring said cross product holographic interference pattern to said mirror surface, thereby forming said cross product diffraction grating on said mirror surface.

2. A method according to claim 1, in which said zone plate interference pattern is embodied in a zone plate mask and said zone plate mask is contact printed onto said light-sensitive medium under illumination adjusted to generate said interference pattern for said first holographic diffraction pattern.

3. A method according to claim 2, in which said zone plate mask is generated by exposing a light-sensitive medium to an interference pattern of coherent radiation having a first wavelength formed by combining radiation from a plane wave traveling along a predetermined axis with radiation from a point source located at a point source position along said predetermined axis, said first wavelength being different from said predetermined wavelength, and by scaling said first zone plate by the ratio of said predetermined wavelength and said first wavelength to form said zone plate mask.

4. A method according to claim 2, in which said zone plate interference pattern is generated by forming a pattern of light and dark areas representative of the intensity distribution of an analytic zone plate having a predetermined relationship to said predetermined parameters and transferring said zone plate interference pattern to a light-sensitive mask.

5. A method according to claim 4, in which said pattern of light and dark areas are generated with a predetermined scale factor with respect to said cross product diffraction grating and said cross product pattern is transferred with a reduction in scale of the inverse of said predetermined scale factor to said mask medium.

6. A method according to claim 2, further comprising the additional steps of:

forming an inverse mask of said zone plate mask and contact printing said inverse mask onto said light-sensitive medium under illumination adjusted to form a second holographic diffraction grating, corresponding to said holographic diffraction grating, with inverted phase, whereby a combined cross product diffraction grating pattern carrying the cross product of said zone plate and both of said diffraction gratings is formed in said light sensitive medium.

7. A method according to claim 1 in which said light sensitive medium is a photoresistive material disposed on said mirror surface and said step of transferring comprises ion milling said mirror surface through said photoresistive material.

8. A method according to claim 1 in which said step of transferring said cross product pattern further comprises the step of processing said light sensitive medium to form a final holographic mask carrying said cross product holographic diffraction pattern and transferring said pattern from said mask to said mirror surface.

* * * * *